United States Patent [19]
Ueda

[11] 3,750,100
[45] July 31, 1973

[54] SYSTEM FOR SENSING COLLISION OF MOTOR VEHICLES
[75] Inventor: Atsushi Ueda, Himeji, Japan
[73] Assignee: Mitsubishi Denki Kabushiki Kaisha, Tokyo, Japan
[22] Filed: Mar. 9, 1972
[21] Appl. No.: 233,188

[30] Foreign Application Priority Data
Mar. 16, 1971 Japan.............................. 46/14584

[52] U.S. Cl.................. 340/52 H, 340/61, 340/262, 200/61.45
[51] Int. Cl............................................. B60q 1/52
[58] Field of Search...................... 340/52 H, 53, 61, 340/71, 262, 263; 200/61.45

[56] References Cited
UNITED STATES PATENTS
3,593,277  7/1971  Faude ........................... 340/262 X Primary Examiner—Alvin H. Waring
Attorney—E. F. Wenderoth, V. M. Creedon et al.

[57] ABSTRACT

A collision speed sensor senses a collision speed in excess of its predetermined value to produce an output for application to a pulse generator connected to an AND gate. Then the generator generates a pulse having a predetermined fixed duration. A deceleration sensor also connected to the AND gate responds to a deceleration signal in excess of its predetermined value to produce a deceleration pulse. Only in the simultaneous presence of both pulses the gate produces a signal indicating a dangerous collision having occurred.

6 Claims, 6 Drawing Figures

SYSTEM FOR SENSING COLLISION OF MOTOR VEHICLES

BACKGROUND OF THE INVENTION

This invention relates to a system for sensing a collision of a motor vehicle with another motor vehicle or an obstacle tending to injure any person within the motor vehicle.

In the field of motor vehicles, there have been already proposed various types of safety devices called, for example, the "air bag system" or "seat belt retractor system" for protecting any person within the motor vehicle against injure upon its colliding with an obstacle such as another motor vehicle. In order to actuate the safety device in response to a collision of the associated motor vehicle with another one or the like, it is required to sense that collision. Particularly, in the air bag system, it must be ensured that any collision of the motor vehicle occurring at a collision speed in excess of a predetermined dangerous magnitude be sensed within about 10 milliseconds. On the other hand, collisions occurring at very low speeds or even at high speeds should not be sensed so long as such collisions result from light weight obstacles which are considered not to injure any person within the colliding motor vehicle.

SUMMARY OF THE INVENTION

Accordingly it is an object of the invention to provide a new and improved system for sensing a dangerous collision of a motor vehicle with an obstacle such as another motor vehicle by detecting both a speed at which the collision has occurred and a deceleration speed imparted to the first-mentioned motor vehicle due to that collision.

The invention accomplishes this object by the provision of a system for sensing a collision of a motor vehicle with an obstacle comprising, in combination, first means for sensing a collision speed at which a motor vehicle collides with an obstacle to produce a first output when the collision speed exceeds a predetermined minimum magnitude, second means for sensing a deceleration speed developed on the motor vehicle upon its collision to produce a second output when the deceleration speed exceeds predetermined minimum magnitude, third means connected to the first means to storing a signal representative of the first output to produce a third output, for a predetermined fixed time interval, and fourth means connected to both the second means and the third means to produce an output signal in accordance with the AND logic operation performed thereby.

BRIEF DESCRIPTION OF THE DRAWINGS

The invention will become more readily apparent from the following detailed description taken in conjunction with the accompanying drawings in which.

DESCRIPTION OF THE PREFERRED EMBODIMENTS

Figure 1:
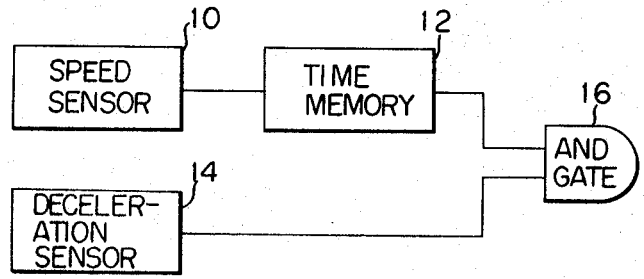
FIG. 1 is a block diagram of a collision speed sensor system constructed in accordance with the principles of the invention.

Referring now to the drawings and FIG. 1 in particular, it is seen that an arrangement disclosed herein comprises a collision speed sensor device 10 for sensing a collision speed at which the associated motor vehicle (not shown) collides with an obstacle (not shown) such as another motor vehicle, thereby to provide a collide speed signal, and a memory 12 connected to the output of the collision speed sensor device 10 to store a signal representative of the collision speed signal therein for a predetermined fixed time interval.

The arrangement further comprises a deceleration sensor device 14 for sensing a deceleration speed imparted to the motor vehicle resulting from the above-mentioned collision to produce a deceleration signal G, and an AND gate 16 connected to the outputs of both memory and deceleration sensor device 12 and 14 respectively.

Figure 2:
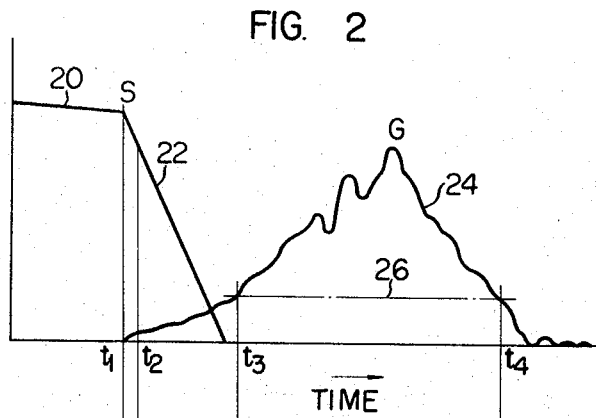
FIG. 2 is a graph illustrating a change in speed and a deceleration of a motor vehicle due to its collision with an obstacle as functions of time.

Referring now to FIG. 2, wherein a speed and a deceleration speed G is plotted in ordinate against time in abscissa, a motor vehicle(not shown) travelling at a speed S following a line 20 has collided with another motor vehicle or an obstacle(not shown) to rapidly decrease in speed following a line 22 until the speed becomes null. On the other hand, the collision causes the production of a deceleration speed G on the motor vehicle as shown at curve 24.

Figure 4:
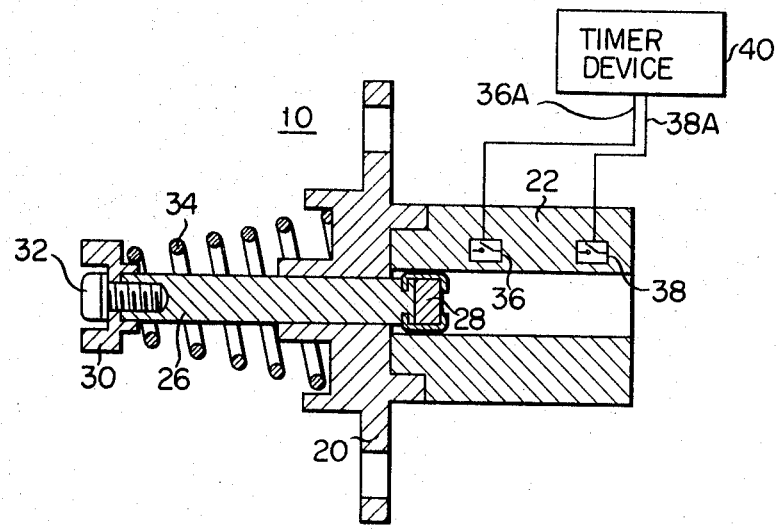
FIG. 4 is a longitudinal sectional view of a collision speed sensor device constructed in accordance with the principles of the invention.

The collision speed sensor device 10 can have a construction as shown in FIG. 4. The arrangement illustrated comprises a mounting plate 20 adapted to be secured to a motor vehicle in rear of and adjacent its front bumper for example although the vehicle and front bumper are not illustrated. Fixedly secured to the mounting plate 20 on the central portion of one face, in this case, the righthand face as viewed in FIG. 4 is a hollow cylindrical member 22 having a central cylindrical opening 24 extending therethrough. Then an actuating rod 26 movably extends through the mounting plate 20 from the opposite face until one end portion thereof slightly extends into the cylindrical opening 24 and has a permanent magnet 28 with the illustrated polarity suitably attached to the extremity thereof. The actuating rod 26 has a collision bearing member 30 of U-shaped section secured to the other end thereof as by a set screw 32 and a compression spring 34 disposed around the rod between the collision bearing member and mounting plate 30 and 10 respectively serving to normally locate the magnet 28 in its position illustrated in FIG. 4.

A pair of reed switches 36 and 38 are disposed within the wall of the hollow cylindrical member 22 equidistantly from the longitudinal axis of the cylindrical member 22 or the opening 24 and spaced away from each other by a predetermined fixed distance of say 10 cm. The read switches 36 and 38 are connected to a timer device schematically designated at block 40 through respective leads 36A and 38A.

The timer device 40 is of the known construction and may include, for example, a capacitor(not shown) adapted to be initiated to charge from a source of constant DC voltage (not shown) in response to the operation of a first one of the reed switches and to terminate to charge in response to the operation of the second switch. Upon operating the second reed switch, a charge accumulated the capacitor is measured to provide a measure of a time interval between when the first switch has been operated and when the second switch is operated. This is because the charge on the capacitor is directly proportional to the corresponding charging time.

The collision speed sensor device 10 as above described can be attached to a motor vehicle(not shown) on the foremost portion with the collision bearing member 30 directed to the front end of the vehicle. If such a motor vehicle collides with an obstacle such as another vehicle, the collision bearing member 30 immediately responds to the collision to move the actuating rod 26 connected thereto and therefore the permanent magnet 28 from the left to the right as viewd in FIG. 4 whereby the magnet 28 is moved past the reed switches 36 and 38 in succession at a speed as determined by the collision speed. This causes turning on of the first reed switch 36 followed by turning on of the second switch 38. A time difference by which both switches are different in turning-on time point from each is measured by the timer device 40 and provides a measure of the collision speed. This is because the distance between both switches 36 and 38 are known and the measured time interval is inversely proportional to the speed of movement of the permanent magnet 38, that is, the collision speed.

From the foregoing it will be appreciated that the device 10 can sense a collision speed substantially simultaneously with the occurrence of a collision.

Figure 5:
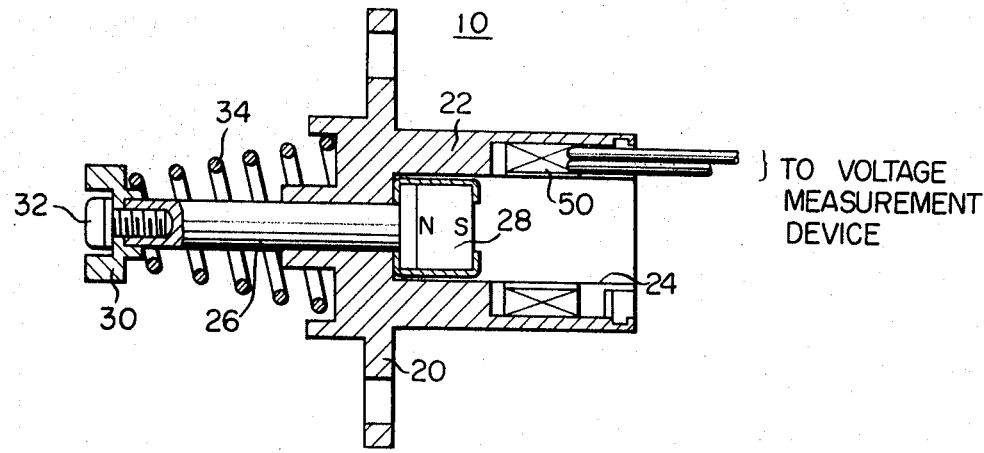
FIG. 5 is a view similar to FIG. 4 but illustrating a modification of the invention.

FIG. 5 wherein like reference numerals designate the components identical to those illustrated in FIG. 4 shows a modification of the arrangement of the latter Figure. In the arrangement of FIG. 5, an electromagnetic coil 50 is utilized in place of the pair of reed switches 36 and 38. More specifically, the coil 42 is fixed disposed within the wall of the hollow cylindrical member 22 integral with the mounting plate 20 and outside the central opening 24 with both components 20 and 22 formed of any suitable magnetic material. When the permanent magnet 28 passes through the coil 50 due to a collision, the coil 50 induces thereacross a voltage proportional to the speed of movement of the magnet 28. Then the voltage thus induced reads by a voltage measurement device(not shown) to provide a measure of the collision speed. In other respects, the arrangement is substantially identical to that shown in FIG. 4.

Figure 6:
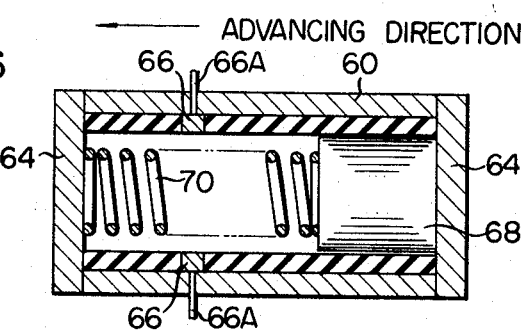
FIG. 6 is a longitudinal sectional view of a deceleration sensor device constructed in accordance with the principles of the invention.

The deceleration sensor device 14 as shown in FIG. 1 may be any one of acceleration pickup devices, vibration pickup devices etc. presently put to practical use. and can be preferably of a construction as shown in FIG. 6. The arrangement illustrated comprises a metallic housing 60 in the form of a hollow cylinder, an electrically insulating sleeve 62 snugly fitted into the housing 60 and a pair of end plates 64 closing both ends of the housing 60. A pair of electric contacts 64 are embedded in diametrically opposite relationship in the insulating sleeve 62 at their positions spaced away from one of the end plates 64, in the example illustrated, the righthand one as viewed in FIG. 6 by a predetermined fixed distance. The contacts 66 have respective exposed faces flush with the internal surface of the sleeve 62 and include individual leads 66A insulating by extending through the wall of the housing 60 for the purpose as will be apparent later. An inertial mass or a movable body 68 of any suitable, electrically conductive material is disposed to be slidable within the housing 66 and normally positioned so as to abut against one of the end plates 64, in this case, the righthand one by the action of a compression spring 70 disposed between the same and the other end plate 64.

The arrangement of FIG. 6 is suitably disposed on the front portion of the associated motor vehicle(not shown) with the inertial mass 68 located on the rear portion thereof in the direction of advance of the motor as shown at the arrow in FIG. 6.

The distance between the contacts and righthand end plate 66 and 64 respectively corresponds to a minimum level of the deceleration speed above which a collision may injure any person within the colliding vehicle. That minimum level is shown at horizontal broken line 26 in FIG. 2.

Upon the occurrence of a collision of the associated motor vehicle(not shown), the inertial mass 68 is moved in the lefthand direction as viewed in FIG. 6 against the action of the compression spring 70. Under these circumstances the magnitude of movement of the inertial mass 68 is proportional to a deceleration speed G developed on the vehicle and therefore on the device 14 due to the collision. If the inertial mass 68 reaches the contacts 66 to engage them then the contacts are interconnected through the mass 68 which can easily sensed by any suitable external sensor (not shown) through the leads 66A. Therefore whether the particular deceleration speed is above or below its minimum level can readily been determined by whether the inertial mass 68 engages the contacts 66.

Figure 3:
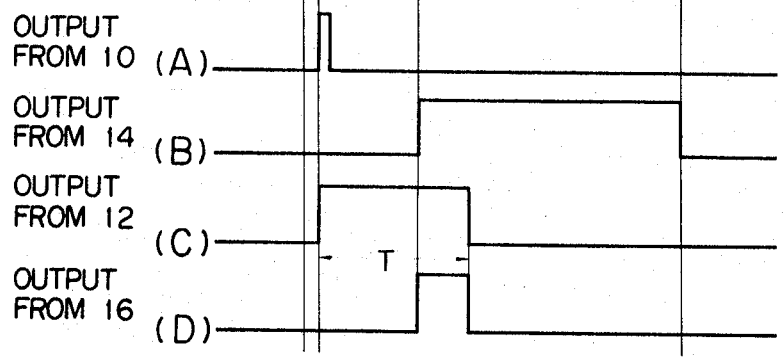
FIG. 3 is a graph illustrating waveforms developed at various points in the system shown in FIG. 1.

The operation of the collision sensor system as shown in FIG. 1 will now be described in conjunction with FIGS. 2 and 3. It is assumed that the associated motor vehicle travelling at a speed flowing the line 20 as shown in FIG. 2 has collided with an obstacle such as another one at a time point $t_1$ as shown in the same Figure. After that collision, the vehicle rapidly decrease in speed as shown at the line 22 in FIG. 2. On the other hand, the speed sensor device 10 senses a corresponding collision speed as above described in conjunction with FIGS. 4 and 5. If the sensed speed exceeds a predetermined magnitude such as 30km/h above which any person within the vehicle may be injured due to the collision, the speed sensor device 10 produces an output pulse of waveform A shown in FIG. 3 at a time point $t_2$ very slightly delayed from the time point $t_1$. Alternatively, if the sensed speed is below the predetermined magnitude the device 10 produces no output.

The collision also produces on the vehicle a deceleration speed G progressively increased to a maximum value and then gradually decayed to a null magnitude as shown at solid curve 24 in FIG. 2. At a time point $t_3$ (see FIG. 2) when the deceleration speed G reaches its minimum level as shown at broken line 26 in FIG. 2, the deceleration sensor device 14 produces a rectangular pulse which, in turn, terminates at a time point $t_4$ when the deceleration speed decreased in magnitude reaches its minimum level in broken line 26. That pulse has a waveform B as shown in FIG. 3.

Where the speed and deceleration sensor devices 10 and 14 have produced the respective outputs, the system of FIG. 1 should provide an output indicating that the collision as having just occurred is dangerous. However, as best understood from FIGS. 2 and 3, and particularly from the waveforms A and B shown in FIG. 3, a signal representative of a deceleration speed G due to a collision is produced behind a signal representative of the corresponding collision speed. In other words, a time delay exists between the outputs from the devices 10 and 14. This means that the AND logic is disabled to be performed with those two outputs. In order to compensate for the time delay as above described, it is required to use means for temporarily storing the output from the speed sensor device 10. Such storing means may be formed of a FLIP-FLOP or any other memory but any mulfunction of the FLIP-FLOP will result in a fatal mulfunction of the system.

However, upon the occurrence of a dangerous collision, the deceleration sensor device 14 necessarily produces a deceleration signal within a certain time after the speed sensor device 10 has produced its output. Therefore as will be understood, it is sufficient to store the output from the speed sensor device 10 for some time interval. Accordingly, the invention comprises the time memory 12 responsive to the output from the speed sensor device 10 to temporarily store a signal representative of that output therein. As understood from FIG. 3, the memory 12 that may be simply formed of a monostable multivibrator responds to the leading edge of the output pulse(waveform A) from the speed sensor device 10 to produce a rectangular pulse having a predetermined fixed duration T as shown at waveform C in FIG. 3. It has been found that that duration is preferably of 20 milliseconds. If the duration of the pulse from the memory 14 exceeds the figure just specified then a time delay required for sensing a collision is too long to cause the system to perform the operation of sensing the collision.

As above described, the deceleration sensor device 14 responds to a deceleration speed in excess of its predetermined magnitude. In FIG. 3, the deceleration sensor device 14 produces a rectangular pulse(waveform B) at a time point $t_3$ still lying in the duration T of the pulse (waveform C) from the memory 12. The pulse from the device 14 continues up to a time point $t_4$ when the deceleration speed again equals or falls below the predetermined magnitude.

On the other hand, if the deceleration sensor device 14 fails to produce its output within the duration of the pulse from the memory 12, the AND gate 16 has only one input applied thereto thereby to produce no output. That is, the AND gate 14 is operative to produce an output in accordance with the AND logic conditions.

In summary, the invention comprises a time memory formed, for example, of a monostable multivibrator to store a signal representative of a collision speed signal for a predetermined fixed time interval. This ensures that a time delay required for the deceleration sensor device is compensated for with a very simple construction and that the resulting system for sensing collisions has a very low probability of performing mulfunctions.

While the invention has been illustrated and described in conjunction with a few preferred embodiments thereof it is to be understood that various changes in the details of construction and the combination and arrangement of parts may be resorted to without departing from the spirit and scope of the invention.

What is claimed is:

1. A system for sensing a collision of motor vehicles, comprising, in combination, first means for sensing a collision speed at which a motor vehicle collides with an obstacle to provide a first output when the collision speed exceeds a predetermined minimum magnitude, second means for sensing a deceleration speed developed on the motor vehicle upon its collision to produce a second output when the deceleration speed exceeds a predetermined minimum magnitude, third means connected to said first means to storing a signal representative of said first output to produce a third output for a predetermined fixed time interval, and fourth means connected to both said second means and said third means to produce an output signal in accordance with the AND logic operation performed thereby.

2. A system for sensing a collision of motor vehicles as claimed in claim 1, wherein said first means includes a movable member movably disposed on one portion of the motor vehicle to respond to the collision to be immediately moved a predetermined fixed distance, and means for measuring a time interval for which the movement of said movable member is effected.

3. A system for sensing a collision of motor vehicles as claimed in claim 1, wherein said first means includes a stationary electromagnetic coil, and a permanent magnet responsive to the collision to pass through said electromagnet coil to induce across said coil a voltage proportional to the collision speed.

4. A system for sensing a collision of motor vehicles as claimed in claim 1, wherein said third means includes a time memory driven with said first output from said first means to produce a pulse having a predetermined fixed duration.

5. A system for sensing a collision of motor vehicles as claimed in claim 4, wherein said duration is of about 20 milliseconds.

6. A system for sensing a collision of motor vehicles as claimed in claim 1, wherein said second means includes a movable member of electrically conductive material disposed normally at its predetermined position to be movable in response to the collision, and electrical contact means disposed at its position spaced away from the normal position of said movable member by a predetermined fixed distance, said electrical contact means being electrically interconnected through said movable member after having moved at least said fixed distance.

* * * * *